United States Patent
Selz et al.

(10) Patent No.: US 12,398,987 B2
(45) Date of Patent: Aug. 26, 2025

(54) METHOD FOR ASCERTAINING POSITION INFORMATION FOR AN EFFECTOR, EFFECTOR, COMPUTING UNIT AND WEAPONS SYSTEM

(71) Applicant: Diehl Defence GmbH & Co. KG, Ueberlingen (DE)

(72) Inventors: Andre Selz, Ueberlingen (DE); Rene Freter, Herdwangen-Schoenach (DE)

(73) Assignee: Diehl Defence GmbH & Co. KG, Ueberlingen (DE)

( * ) Notice: Subject to any disclaimer, the term of this patent is extended or adjusted under 35 U.S.C. 154(b) by 1085 days.

(21) Appl. No.: 17/167,270

(22) Filed: Feb. 4, 2021

(65) Prior Publication Data

US 2021/0310776 A1    Oct. 7, 2021

(30) Foreign Application Priority Data

Feb. 4, 2020 (DE) .......................... 102020000711.2

(51) Int. Cl.
| | |
|---|---|
| F42B 15/01 | (2006.01) |
| F41G 7/00 | (2006.01) |
| F41G 7/34 | (2006.01) |

(52) U.S. Cl.
CPC .............. *F42B 15/01* (2013.01); *F41G 7/007* (2013.01); *F41G 7/343* (2013.01)

(58) Field of Classification Search
CPC ...................... F42B 15/00–01; F41G 7/00–36
See application file for complete search history.

(56) References Cited

U.S. PATENT DOCUMENTS

| | | | | |
|---|---|---|---|---|
| 4,232,313 | A * | 11/1980 | Fleishman | .............. G01S 13/93 342/36 |
| 10,962,990 | B2 * | 3/2021 | Choiniere | ............. G01S 1/0428 |

(Continued)

FOREIGN PATENT DOCUMENTS

| | | |
|---|---|---|
| GB | 2017448 A | 10/1979 |
| WO | 2018109435 A1 | 6/2018 |

OTHER PUBLICATIONS

Laaraiedh, Mohamed & Avrillon, Stephane & Uguen, Bernard. (2011). Cramer-Rao lower bounds for nonhybrid and hybrid localisation techniques in wireless networks. European Transactions on Telecommunications. 23. 10.1002/ett.1530. (Year: 2011).*

*Primary Examiner* — Matthew M Barker
(74) *Attorney, Agent, or Firm* — Laurence A. Greenberg; Werner H. Stemer; Ralph E. Locher (57) ABSTRACT

A method for ascertaining position information for an effector after launching from a launcher of a weapons system including the effector and at least one weapons system unit different from the effector, includes receiving a time synchronization signal at the effector in such a way that the effector and the at least one weapons system unit are temporally synchronized at the latest when the effector is launched. The effector furthermore receives position data of the at least one weapons system unit and a timestamp with unique assignment to the position data through a wireless communication connection after the effector has been launched. Position information is ascertained based on the timestamp, the effector's own time upon receipt of the timestamp, and the position data assigned uniquely to the timestamp. An effector, a computing unit and a weapons system are also provided.

24 Claims, 6 Drawing Sheets

(56) References Cited

U.S. PATENT DOCUMENTS

| | | | |
|---|---|---|---|
| 2004/0232277 A1* | 11/2004 | Gehlot | F41G 7/346 |
| | | | 244/3.19 |
| 2008/0211718 A1* | 9/2008 | Martin | G01S 19/18 |
| | | | 342/357.56 |
| 2013/0001354 A1 | 1/2013 | Meyer et al. | |
| 2016/0327370 A1 | 11/2016 | Holder | |
| 2017/0314892 A1* | 11/2017 | Holder | G01S 13/883 |
| 2017/0370678 A1* | 12/2017 | Holder | G01S 13/66 |
| 2019/0088156 A1* | 3/2019 | Choi | G05D 1/0022 |
| 2019/0323807 A1* | 10/2019 | Smith | G01S 5/0242 |

* cited by examiner

METHOD FOR ASCERTAINING POSITION INFORMATION FOR AN EFFECTOR, EFFECTOR, COMPUTING UNIT AND WEAPONS SYSTEM

CROSS-REFERENCE TO RELATED APPLICATION

This application claims the priority, under 35 U.S.C. § 119, of German Patent Application DE 10 2020 000 711.2, filed Feb. 4, 2020; the prior application is herewith incorporated by reference in its entirety.

BACKGROUND OF THE INVENTION

Field of the Invention

The present invention relates in particular to a method for ascertaining position information for an effector after launching from a launcher of a weapons system, a corresponding effector, a corresponding computing unit, and a corresponding weapons system.

Many military systems use satellite-based radio navigation systems (e.g. GPS) for ascertaining the position and for navigating an effector, for example a guided missile of a weapons system, to a target. While such systems do supply comparatively accurate position data, the problem nevertheless presents itself that such systems are in some circumstances not available in an emergency situation if, for example, they are in the hands of individual states. In order to circumvent that problem, effectors or guided missiles often include additional inertial navigation systems. However, due to inaccuracies in the measurement of the sensors used in inertial navigation systems, the performance capability and performance when determining the position can be disadvantageously restricted in comparison with radio navigation systems.

Radar systems are also amongst those used in ground-based air defense systems (GBAD), wherein a respective radar of the associated weapons system captures the effector, missile or guided missile that has been launched for determining its position, and the ascertained position is used for navigation. While such radar systems are indeed also subject to error, an error correction is, however, usually possible through the radar return channel. There is, however, a disadvantage in that in an emergency the position determination and navigation cannot be performed without the radar system, so that there is in fact an undesired heavy dependency between the effector and the radar.

BRIEF SUMMARY OF THE INVENTION

It is accordingly an object of the invention to provide a method for ascertaining position information and for navigation for an effector, in particular missiles or guided missiles, of a weapons system, an effector, a computing unit and a weapons system, which overcome the hereinaforementioned disadvantages of the heretofore-known methods and devices of this general type and which in particular enable reliable position ascertainment and, in appropriate cases, navigation of an effector after it has been launched in an emergency situation.

With the foregoing and other objects in view there is provided, in accordance with the invention, a computer-implemented method for ascertaining position information for an effector after having been launched from a launcher of a weapons system.

The weapons system can include at least one effector and at least one launcher, wherein the at least one launcher is configured to launch the effector.

The effector can be a missile, in particular a guided missile. The effector can in particular be a missile, in particular a guided missile, configured to approach a target or a target object.

The weapons system includes the effector and at least one mobile or stationary weapons system unit that is different from the effector. The weapons system unit can, for example, be a launcher assigned to the effector for launching it, a further launcher different therefrom, or another unit that is or can be integrated into the weapons system for data communication, such as for example an unmanned flying system, in particular a drone, a ground-based vehicle, a control center (in particular a so-called tactical operations center—TOC), an aircraft, a missile, a ship, an in particular ground-based transmitting unit or a ground-based transmitter, etc.

If the weapons system includes a plurality of weapons system units, these can be configured as a weapons group, in particular with mutual data networking for the exchange of data such as time synchronization, position, identifications, etc.

The proposed computer-implemented method includes, in particular on the effector side, the following steps:
receiving a time synchronization signal for the time synchronization of the effector with the at least one weapons system unit in such a way that the effector and the at least one weapons system unit are temporally synchronized at the latest when the effector is launched;
receiving position data of the at least one weapons system unit of the weapons system;
receiving a timestamp with a unique assignment to the position data through a wireless communication connection after the effector has been launched; and
ascertaining the position information on the basis of the timestamp, the effector's own time on receipt of the timestamp, and of the position data assigned uniquely to the timestamp on the basis, preferably, of time-of-flight calculations.

In this context, the term "effector side" is in particular intended to indicate that the method steps, and any further method steps, depending on the embodiments of the method, are carried out by the effector, for example by one or a plurality of data processing units of the effector.

The receipt of the respective data can, for example, take place through a wireless data communication unit of the effector that can be configured unidirectionally for the receipt of data, or bidirectionally for the receipt and transmission of data. In particular, the data can, for example, be transmitted through an uplink connection which is configured from the point of view of the weapons system unit. Transmissions from the effector to the weapons system unit, in particular to the weapons system, can correspondingly take place through a downlink connection.

In the case of a unidirectional signal transmission through uplink, the ascertainment of the position information, in particular the execution of corresponding data processing steps, can be carried out with a data processing unit of the effector. If a bidirectional signal transmission is configured or possible, at least parts of the data processing steps can be outsourced to data processing units of one or a plurality of weapons system units. Nevertheless, from the point of view of data security, data integrity, and to reduce the risk of hostile reconnaissance, it can be advantageous if the quantity of data to be transmitted is as low as possible, and the ascertainment or the data processing steps are/is carried out by the data processing unit of the effector.

A timestamp is in particular intended to refer to a data signal on the basis of which, in a time-synchronized communication system, with the knowledge of the receipt time point of the data signal on the receiver side, the time-of-flight necessary for transmitting from the transmitter to the receiver can be ascertained or calculated. In other words, a timestamp is intended to refer to a data signal that in particular enables a time-of-flight calculation. In general, timestamps refer to unique assignments between the time and events.

The timestamp in the sense of the present application can, in particular, include a temporal signature of the transmitting time point, i.e. the time point at which a data packet is transmitted to the effector. If the effector and the at least one weapons system unit, for example both, include a continuous counter which are configured in each case to count up an increment corresponding to an equal time span or to count down a decrement, the time synchronization signal can serve for the time synchronization of the effector and the at least one weapons system unit for synchronizing the counter values, i.e. setting the counters to the same value. The timestamp can then include a counter value instead of a signature of the transmitting time. This has the advantage that bandwidth can be saved in this way during the transmission. It is also conceivable for example that only the at least one weapons system unit includes a counter. In this case, the time synchronization signal expediently includes the current counter value and the information to which timespan an increment or decrement corresponds. On the basis of the time synchronization carried out in the proposed method, the receiver, that is the effector, can in particular ascertain from the difference between the receipt time point, i.e. the effector's own time at receipt, and the transmitting time point, the time-of-flight associated with the data transmission. The effector's own time at receipt and the transmission time point would, when continuous counters are used, correspond to the counter values of the effector or of the at least one weapons system unit. If only the at least one weapons system unit would have a counter, the information transmitted with the time synchronization signal relating to the time span corresponding to an increment/decrement would be employed for ascertaining the difference between the receipt time point and the transmission time point.

The formulation "with a unique assignment to the position data" in particular is intended to mean that the respective timestamp is assigned uniquely to the respective position data. The formulation "unique assignment" in particular in association with the term timestamp is intended to mean that the position data are or were present at the time point defined by the timestamp. In other words, a unique time point or a unique temporal signature is assigned to the position data with the uniquely assigned timestamp, wherein the time point corresponds to the actual presence of the position data.

The receipt of the position data and/or of the timestamp can, in particular, include a receipt of one or a plurality of data packets. A data packet can, for example, include a 2-tuple of position data and timestamp, a 2-tuple of an identifier and position data, a 2-tuple of an identifier and timestamp, or a 3-tuple of position data, timestamp and identifier. The identification in particular will be considered more precisely further below in connection with further embodiments.

It is provided according to the method that the time synchronization is present at the latest by the time the effector is launched. In particular a time synchronization that was already carried out when the weapons system was constructed can be used. Alternatively the time synchronization can also be carried out, in particular carried out again, immediately before launching the effector. This is because if there is no time synchronization, or if it has already aged, it is provided that a time synchronization is present or established before, at the latest when, the effector is launched, so that, on the basis of the timestamp and of the effector's own time, position information can be ascertained on the basis in particular of time-of-flight calculations. The time synchronization in this case includes at least the effector concerned and at least the weapons system units that are each involved in a launch.

If the position data are received or transmitted before launching the effector, then the time of their receipt or transmission can be before or after the time synchronization.

A temporal synchronization of the effector with the at least one weapons system unit is established with the time synchronization signal. If the effector receives, for example from the weapons system unit, a timestamp to given, uniquely assigned, position data, the effector, or a correspondingly configured data processing unit of the effector, can ascertain on the basis of the existing time synchronization the time-of-flight for the transmission of the timestamp signal, in particular a corresponding data packet, through the wireless communication connection, from the temporal difference between the time point defined by the timestamp and the receipt time point of the timestamp. Based in turn on the ascertained time-of-flight, the effector, or the data processing unit, can ascertain, from the propagation speed or signal speed known for the wireless communication connection, the distance between the effector and the position given or defined by the position data. The effector can then use the distance ascertained in this way, together if relevant with the position data, as position information. In particular, the ascertained position information can be used, particularly on the effector side, for correction or checking of position data that were ascertained by an independent navigation unit on the basis, for example of the principle of inertial navigation. It is consequently possible with the proposed method to obtain more accurate or more reliable position data for the effector, in particular after the effector has been launched in an emergency situation.

The method for ascertaining position information can in particular be integrated into a navigation method, wherein the position information ascertained by the method can be used for correction, confirmation and/or refinement of the respective effector navigation position.

In one exemplary embodiment of the method, the effector can be configured to receive, after time synchronization, first position data of the weapons system unit forming the launcher of the effector, and second position data of at least one further weapons system unit. On the basis of the position signals and respectively uniquely assigned timestamps, the effector can, after it has been launched, ascertain position information on the basis in particular of time-of-flight calculations and triangulation on the basis of the first and second position data.

The effector can in particular be configured so that after having been launched it repeatedly receives timestamps, in particular continuously or intermittently or periodically, for which there is a unique assignment to position data or which can be ascertained in particular by the effector. On the basis of the repeated reception, position information can correspondingly be ascertained, and on the basis of that, a repeated, continuous or intermittent or periodic correction or checking of the effector's own position data can take place.

The position data can, for example, be geodata that are representative of the absolute position with respect to the Earth's surface, i.e. to a reference system assigned to the Earth. The position data can furthermore be representative of position coordinates, or can include such position coordinates that state a relative position of the weapons system unit assigned to the position data in a defined reference system of the weapons system.

In general, position data should in particular refer to such data that state or describe the position of a weapons system unit assigned to the position data in a coordinate reference system used by the weapons system or in a coordinate reference system defined for the units of the weapons system concerned in each case.

According to one embodiment, position data and timestamps can be received, each with a unique assignment from two or more weapons system units located at different positions. For the two or more weapons system units, corresponding position information can accordingly be calculated on the basis of time-of-flight calculations and, to the extent possible or required, furthermore based on triangulation. For example, for each received timestamp, when using a plurality of weapons system units, the respective distance or the respective spacing between the position of the effector on receipt of the position data and of the position of the weapons system unit corresponding to the position data can be ascertained. Position information can then be ascertained or calculated on the basis of triangulation supported by the distances or spacings that have been ascertained.

In embodiments, position data in particular can be used that have the same timestamps for the time synchronization. The weapons system units can, for example, transmit timestamps in a time-synchronous manner, wherein the effector can immediately use the position information of the time-synchronous timestamps for triangulation. It is, for example, possible for the effector to group timestamps having a time synchronization which is the same but which are received at different time points to form datasets, and to ascertain or calculate position information on the basis of triangulation on the basis of such datasets.

Timestamps having a time synchronization which is the same are intended to refer in particular to timestamps that were generated substantially simultaneously in the time-synchronous weapons system. Such timestamps generated by different weapons system units can, for example, each contain the same time-synchronous transmission time point as temporal signatures. In other words, data signals corresponding to the timestamps can be transmitted from the two or more weapons system units substantially simultaneously, i.e. time-synchronously. In this context, the term "substantially" should in particular be understood to mean at the same or identical times "apart from unimportant or negligible differences."

It can be provided according to one embodiment that the unique assignment between position data and the respective timestamp is given by linking position data and timestamp when they are transmitted. The position data and the respective timestamp can, for example, be transmitted and received in a common data packet, in particular substantially simultaneously, wherein the timestamp can correspond to a temporal signature of the transmission time point of the data packet.

On the basis of a unique assignment of the timestamps to the position data, the position information can in particular be ascertained through time-of-flight calculations.

Transmitting position data and timestamp in a common data packet, i.e. a common transmission, is in particular advantageous if the position data are not yet known to the effector, either because the position, and thereby the position data, of the assigned weapons system unit have changed, or because the position data of the assigned weapons system unit have not yet been received or transmitted.

In embodiments it can be provided that the unique assignment between position data and the respective timestamp is given by a unique identifier that is received or transmitted together with the position data and/or the respective timestamp. The identifier in this case can correspond to an identifier uniquely assigned to the weapons system unit in the weapons system.

As far as the identifier, which is also referred to below by the abbreviation ID, is concerned, it is for example possible, as already described further above, for the position data to be transmitted together with the identifier as a 2-tuple. Such 2-tuples can, for example, be transmitted to the effector before launch with known position data and, in particular, with position data of the weapons system unit that prospectively will not change any more. On the basis of the ID, the effector can then ascertain the assigned position information using the 2-tuple including the ID and a timestamp received or transmitted to the effector after launch.

If the position data are not known or have not yet been transmitted before launch, they can thus be transmitted after launch as a 2-tuple including the ID and the position data. It is also possible in this case for a 3-tuple including the ID, the position data and a timestamp to be transmitted, so that the effector can already ascertain position information on the basis of the first transmission or of a first receipt of a 3-tuple. Alternatively, the effector, after receiving the 2-tuple, and in particular when position data of the weapons system unit is unchanged, can receive one or a plurality of further 2-tuples that contain the ID and a respective timestamp.

The use of an identifier in particular enables a reduction in the quantity of data to be transmitted when the transmission of a timestamp is repeated, in particular when position data of the weapons system unit is unchanged, to the extent that less bandwidth is necessary for a transmission of an identifier than for the transmission of the respective position data.

Furthermore, with a suitable choice of the identifier and previous transmission of the identifier and registration at the effector, improved transmission security can be achieved, in particular if the effector is configured in such a way that it only accepts position data and/or timestamps from identifiers that were registered at the effector before launch. A further improvement in the transmission security can be achieved if the ID and/or position data and/or timestamps are transmitted in encrypted form.

In exemplary embodiments with multiple weapons system units it can be provided that first position data and/or timestamps of a first weapons system unit are transmitted with a uniquely assigned first identifier, and that second position data and/or timestamps of a second weapons system unit are transmitted with a uniquely assigned second identifier. Corresponding further identifiers can be used if three or more weapons system units are used for ascertaining the position information.

It can be provided according to embodiments that the position data are received by the effector or transmitted to it at least partially before the effector is launched, and timestamps uniquely assigned in each case to the position data are received or transmitted after launching the effector. As described above, such a procedure is in particular appropriate, for example, if the position data of the weapons system units are or remain unchanged during the flight time of the effector after it has been launched.

It can be provided in embodiments that the position data with a uniquely assigned timestamp are received or transmitted at least partially after the effector has been launched. As described above, such a procedure is, for example, appropriate if in the meantime there is a change in position data after launching, or when the position data have not yet been received/transmitted prior to, i.e. before launching. This procedure can also be used if new weapons system units that have in particular not yet been registered in advance but are nevertheless time-synchronous are integrated into the method for ascertaining position information, in particular after launching the effector.

According to one embodiment it can be provided that the effector is configured to receive position data and/or timestamps with unique assignment in each case after the launch of the effector from such weapons system units of the weapons system, in particular selected, for example previously selected weapons system units, that enter into (data) transmission range of the effector at least in sections along the flight path of the effector. The weapons system units can accordingly be configured to transmit data to the effector when this enters on its flight path into (data) transmission range of the weapons system unit. In particular, weapons system units that at launch time are still not located within (data) transmission range can already be registered before the effector is launched. The selection of such or all weapons system units to be included (prospectively) along the flight path of the effector after launch can, for example, be made on the basis of a simulation of the flight path of the effector.

Weapons system units can, for example, be selected for which the probability of wireless communication with the effector after its launch lies at least in sections along the flight path above a predefined threshold value. Previous knowledge of the position of the weapons system units relative to the target object or target location of the effector can, in particular, be used in this case.

Position data and/or timestamps of such weapons system units for which the probability of wireless communication with the effector lies at least in sections along the flight path above a predefined threshold value can in particular be used for ascertaining the position information after launch of the effector.

The probability can, for example, be ascertained on the basis of the course of a simulated flight path of the effector. In particular, the probability, or a value that describes the probability, can be ascertained or calculated from the distance of the respective weapons system unit from the simulated flight path and, if relevant, taking the local (data) transmission range, in particular the estimated range, of the data connection used in each case, for example on the basis of radio waves, light waves, in particular LASER, and so on.

If, for example, a probability for a possibility of wireless communication with the effector lying above a given threshold value on at least a segment of the simulated flight path is found for a weapons system unit of the weapons system, then the respective weapons system unit can be selected and, in particular, registered at the effector. After the selection, the ID uniquely assigned to the selected weapons system unit can in particular be transmitted to the effector, whereby the weapons system unit can be registered at the effector. On the basis of the registration, the effector, on receipt of a data packet with the registered identifier, can employ corresponding position data and/or timestamps for ascertaining the position information.

If, on the basis of the probabilities, suitable weapons system units for data transmission are found, the respective weapons system units can be informed of this through wired communication and/or wireless communication, for example on the basis of an activation signal. A respective weapons system unit can furthermore be informed with the activation signal of a time window within which a wireless communication with the effector will prospectively be possible. The time window can, for example, be ascertained on the basis of a missile simulation for simulating the position of the effector along the flight path. The time window can in particular be determined in such a way that the weapons system unit only transmits call-waiting signals (in particular ping signals) or uplink signals at such time points or time intervals within which a distance between the effector and the weapons system unit which is ascertained on the basis of data relating to the simulated flight path and the position of the weapons system unit, lies within the scope of the (data) transmission range.

If one or a plurality of weapons system units is or are not stationary, i.e. if one or a plurality of weapons system units are (or should be) moved during the flight duration of the effector, the selection can furthermore be supported by a simulation of the position of the respective weapons system unit or units. If, for example, a simulation of the position of a weapons system unit shows that by probability this will not lie within data transmission range along the flight path of the effector, then a selection of this weapons system unit can be omitted to reduce the possibility of hostile reconnaissance. Conversely, for the case in which the weapons system unit moves to a position suitable for data transmission during the flight duration, this weapons system unit can be selected, wherein a corresponding time and/or location window for data communication with the effector can be communicated to the weapons system unit, for example by a control computer (e.g. a TOC) of the weapons system.

By selecting only those weapons system units that probably enter into data transmission range with the effector, the risk of hostile reconnaissance in particular can be reduced for the weapons system units altogether, since weapons system units that have not been selected are inactive or silent in terms of data communication with the effector. In particular, when a weapons system unit is not selected, for example through active non-selection on the basis of a corresponding non-selection signal, or passive non-selection when an activation signal is absent, the weapons system unit does not demonstrate any transmission activities with regard to the respective effector, so that to this extent the risk of hostile reconnaissance is reduced.

With the objects of the invention in view, there is furthermore provided, in accordance with the invention, an effector, in particular a missile, particularly preferably a guided missile. The effector is configured for launch from a launcher of a weapons system.

The effector includes an electronic data processing unit with a memory. The memory includes instructions which, when executed by the data processing unit, effectuate an effector-side method with the features of one of the embodiments described herein. In particular, the data processing unit can be configured to carry out a corresponding method. The memory can, in particular, store instructions that are readable, in particular computer-readable, by the electronic data processing unit, which instructions, when carried out by the data processing unit, in particular a computing unit or computer-based computing unit, carry out a corresponding method.

It would also be conceivable in terms of the effector-side method that the effector transmits timestamps to the at least one mobile or stationary weapons system unit that differs from the effector, and that position information about the at least one weapons system unit is preferably ascertained from time-of-flight calculations.

Further embodiments of the invention relate to a method corresponding to the effector-side method for the operation of the weapons system and of the weapons system units in connection with the ascertainment of position information for the effector after it has been launched from a launcher. Method steps that relate on the effector side to a receipt of data and the like can be implemented within the scope of the invention on the weapons system-side correspondingly as method steps for conveying data etc., and vice versa.

With the objects of the invention in view, there is additionally provided, in accordance with the invention, a computer-implemented method for ascertaining position information for an effector after launch from a launcher of a weapons system, wherein the weapons system includes the effector and at least one mobile or stationary weapons system unit different from the effector. The method proposed includes in particular the following steps:
  transmitting a time synchronization signal to the effector and the at least one weapons system unit for the time synchronization of the effector and weapons system unit in such a way that the effector and the at least one weapons system unit are synchronized in time at the latest when the effector is launched;
  transmitting position data of at least one of the at least one time-synchronous weapons system unit at the effector; and
  transmitting a timestamp, in particular generated by, for, or through the weapons system unit, with unique assignment to the position data through a wireless communication link to the effector after it has been launched in such a way that the position information on the basis of the timestamp, the effector's own time at the receipt of the timestamp, and the position data uniquely assigned to the timestamp can be ascertained for the effector.

In embodiments it can be provided that the position information can be ascertained for the effector preferably on the basis of time-of-flight calculations.

In embodiments the method can in particular include the step of generating a time synchronization signal for the time synchronization of the weapons system, in particular of the effector and of the at least one weapons system unit. The time synchronization signal generated can be transmitted to the effector and to the at least one further weapons system unit, in particular before launching the effector at the latest. On the basis of the time synchronization signal, subsequent data packets can be transmitted with the respectively prevailing synchronized time to the effector as a signature.

The method proposed above can, from the (weapons) system point of view, in particular relate to the operation of a weapons system unit, or of a commando station assigned to this weapons unit, in particular a so-called tactical operations center with one or a plurality of computing units for controlling and/or monitoring the weapons system provided for launching the effector.

In embodiments, the position data and/or timestamps, each with unique assignment, can be transmitted at least partially to the effector from the respective weapons system unit itself or from a control unit with a data connection to the weapons unit. It is in particular possible that the weapons system unit will transmit position data and/or timestamps continuously or intermittently or periodically. A continuous, intermittent or periodic, etc. correction or check of the position of the effector can thus in particular take place.

According to one embodiment, two or more different weapons system units can be included in the ascertainment of the position information. For two or more weapons system units located at different positions, e.g. locations with different location or position coordinates, particularly located at different geographical places, timestamps corresponding to available or ascertained position data, each with unique assignment to the respective position data, can be transmitted to the effector for the purpose of ascertaining the position information. On the basis of position information that the effector ascertains for example from time-of-flight calculations, the position of the effector can be ascertained, or corrected or checked, in particular through triangulation.

In embodiments it can be provided that the transmission of the timestamps of the two or more weapons system units located at different positions takes place time-synchronously. As already explained above, the term time-synchronously in particular is intended to mean that the weapons units generate and transmit the timestamp simultaneously. This is in particular possible with the support of the time synchronization existing in the weapons system of the weapons system units involved in the proposed method. It is true that the timestamps transmitted time-synchronously can be received at the effector at different time points as a result of time-of-flight differences, but nevertheless the time-synchronous position data corresponding uniquely to the timestamps permit immediate use in a triangulation for ascertaining the position information. With a sufficient number of participating weapons system units, the effector can ascertain its absolute or relative position from the position data information ascertained in each case.

In embodiments, at least one of the at least one weapons system units repeatedly transmits timestamps with unique assignment to the (respective) position data of the weapons system unit through the wireless communication connection to the effector after the effector has been launched. The transmission of the timestamps can in particular take place periodically, in particular at regular time intervals. In embodiments it can be provided that all the weapons system units that are involved and are within data transmission range transmit corresponding timestamps to the effector continuously, in particular periodically. The transmission of the timestamps can in this case be in particular clocked time-synchronously.

In embodiments, in the event of a change to the position data of one of the at least one weapons system unit after the effector has been launched, the changed position data, and a timestamp uniquely assigned to the changed position data, can be transmitted. If the position data of the weapons system unit do not change, it is sufficient for subsequent transmissions to transmit only the timestamp, with a corresponding identifier if relevant, provided the previously transmitted position data are linked to the same identifier.

It can in particular be provided in embodiments that in the case of unchanged position data of a weapons system unit in sequential transmissions, only a timestamp with unique assignment to the unchanged position data is transmitted to the effector in each case. The unique assignment can, as already described, be provided by an identifier transmitted with the position data and the timestamp, for example. The frequency of the transmission of position data can be reduced through such a transmission, whereby the probability of a hostile reconnaissance on the basis of intercepted position data can also be reduced. With a suitably selected identifier, the quantity of data to be transmitted can furthermore be reduced.

In embodiments it is provided that a call-waiting signal is transmitted to the effector, and that at least one temporally first transmission of the position data and/or of the timestamp to the effector only takes place when the call-waiting signal is successful at the effector. The term "successful call-waiting signal" is intended to mean in particular that the transmitting unit can transmit the position data and/or timestamps to the effector through a data transmission link established on the basis of the call-waiting signal (in particular a so-called ping signal). Weapons system units that are initially not within transmission range however can enter into transmission range in the course of the flight path of the effector, and can establish or negotiate respective data transmission connections with the effector by using an appropriate call-waiting signal.

It can be provided in embodiments that the unique assignment between position data and timestamp takes place in that position data and the associated timestamp are transmitted to the effector together, for example in a common dataset or in a common data transmission.

It is furthermore possible in embodiments that the position data and/or the respective timestamp are transmitted to the effector together with a respective identifier to provide a unique assignment.

It is possible, for example, as already described, for the identifier and position data, or the identifier and timestamp, to be transmitted as a 2-tuple in a common data transmission, for example in a data packet. It is also possible for the identifier, position data and timestamp to be transmitted in a common data transmission, for example as a 3-tuple in a common dataset. The last transmission variant can be used in particular when either the identifier or the position are not (yet) known to the effector, for example in the case of position changes or of weapons system units that are not (yet) known to the effector and/or that first can enter into data transmission range in the course of the flight path.

The identifier is preferably assigned uniquely to the weapons system unit. It is in particular possible to use an identifier that is in any case already available in the data network of the weapons system for the weapons system unit(s) in the weapons system.

According to one embodiment it can be provided that only such weapons system units are selected for a transmission of position data and/or timestamp to the effector that enter at least in sections into (data) transmission range of the effector along the (prospective, in particular simulated) flight path of the effector. As already mentioned, such a procedure can be advantageous for reducing the risk of a hostile reconnaissance.

The selection of the weapons system units can in this case take place on the basis of a simulation of the flight path of the effector.

In particular, the possibility of selecting specific weapons system units can be implemented in such a way that a threshold value is specified, and that a weapons system unit is selected if the probability for the weapons system unit of wireless communication with the effector lies above the threshold value at least in sections along the flight path. The threshold value can in particular be selected in such a way that a wireless communication connection between the effector and the weapons system unit will be established with high probability (e.g. greater than 80% or 90%).

Simulation data of the flight path of the effector can, for example, be used for ascertaining the probability, as well as prospective data transmission ranges in each case in relevant segments of the flight path.

It is in particular possible to select only such weapons system units that can certainly (e.g. 100%) establish a communication connection to the effector.

With the objects of the invention in view, there is also provided, in accordance with the invention, a computing unit, in particular a command computing unit, for monitoring and controlling a launcher of a weapons system configured for launching an effector and/or an effector.

The proposed computing unit includes in particular an electronic data processing unit and an electronic data memory. The data memory includes in particular instructions which, when executed by the data processing unit, effectuate a method with the steps according to one of the methods or embodiments of the same described herein.

The computing unit can for example be a command computing unit, in particular a so-called tactical operations center (TOC), a computing unit of a launcher device, in particular of a so-called launcher, and/or a computing unit of an effector.

The computing unit can, in particular, include a plurality of components of the weapons system with positions disposed in a distributed manner in a data network, which can for example be implemented on different weapons system units, and which are or can be connected to one another for the purposes of data transmission through a wired or wireless data transmission connection.

The command computing unit can be configured to monitor and control a launcher of a weapons system configured for launching an effector, for example one or a plurality of launchers.

With the objects of the invention in view, there is concomitantly provided, in accordance with the invention, a weapons system that includes an effector according to one of the embodiments described herein, and at least one computing unit according to one of the embodiments described herein.

As a weapons system unit or units, the weapons system can in particular include one or a plurality of launchers, one or a plurality of drones, one or a plurality of missiles, one or a plurality of aircraft, one or a plurality of vehicles and so forth.

Other features which are considered as characteristic for the invention are set forth in the appended claims.

Although the invention is illustrated and described herein as embodied in a method for ascertaining position information for an effector, an effector, a computing unit and a weapons system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
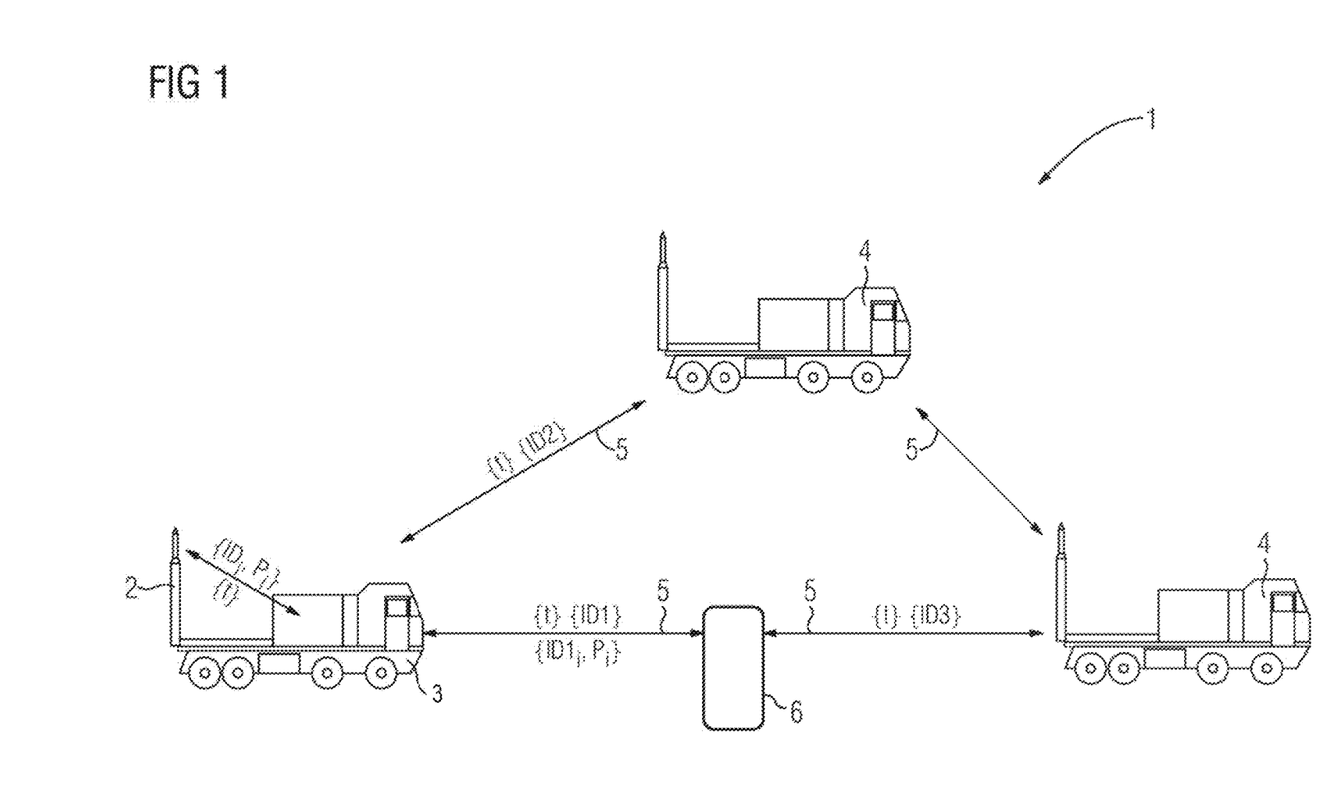
FIG. 1 is a side-elevational view of an example of a weapons system that is configured for ascertaining position information for an effector according to a method described herein.

Referring now to the figures of the drawings in detail and first, particularly, to FIG. 1 thereof, there is seen, by way of example, a weapons system 1, in which the weapons system 1 is configured for ascertaining position information for an effector 2 according to a method described herein.

Concretely, the weapons system 1, drawn by way of example in FIG. 1, includes as weapons system units an effector 2, for example a guided missile, and a first launcher 3 that are configured for carrying out a method according to the invention. As an example for clarifying the method, the weapons system 1 further includes two further second launchers 4. Analogously to the first launcher 3, the further launchers 4 can be constructed and include appropriately configured effectors that are not further drawn.

Figure 2:
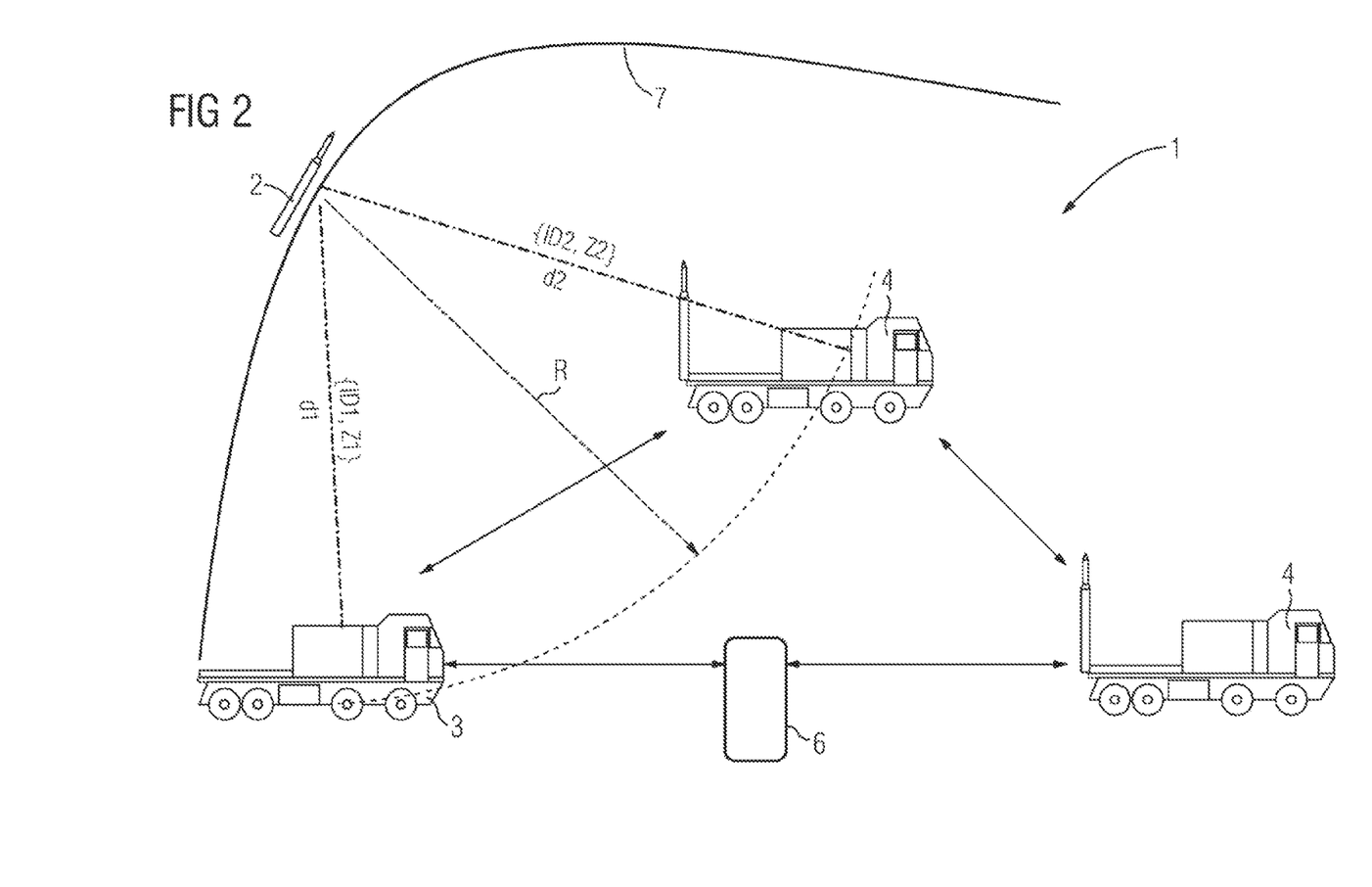
FIG. 2 is a side-elevational view of the weapons system in a first phase after launching the effector.
Figure 3:
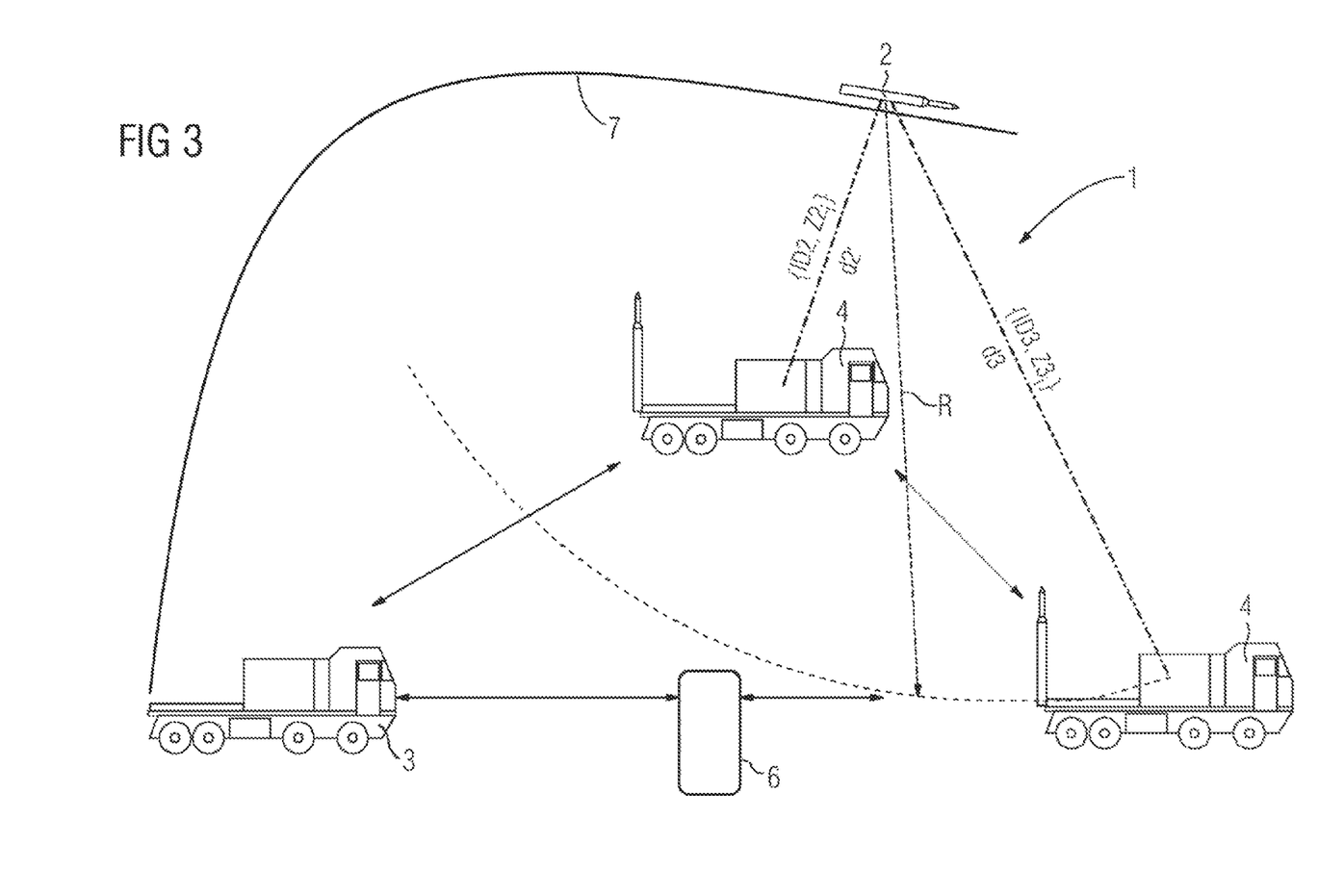
FIG. 3 is a side-elevational view showing the weapons system in a second phase after launching the effector.

The launchers 3 and 4 are connected to one another for the mutual exchange of data through a data communication connection 5 (see the double arrows in FIGS. 1 to 3).

The launchers 3 and 4, as well as the effector 2, each include assigned data transmission units (not shown) which, even after the effector 2 has been launched from the launcher, in particular enable a data communication connection between the effector 2 and the launchers 3, 4 when the transmission range is suitable.

In order to carry out embodiments of the method proposed in accordance with the invention for ascertaining position information, the data communication connection 5 between the effector 2 and the launchers 3, 4 is configured at least unidirectionally, so that, assuming there is a sufficient data transmission range, at least one data transmission is possible from the launcher 3, 4 to the effector 2.

FIG. 1 shows the weapons system 1 in a phase before launching the effector 2. In this phase, the weapons system 1 can carry out a time synchronization of all the units 2, 3, 4 combined into the weapons system. The time synchronization can, for example, be carried out by a computing unit of a tactical control center 6 (also known as a TOC: tactical operations center), in that the TOC 6 can, for example, transmit time synchronization signals {t} to the units provided for time synchronization. Alternatively the time synchronization can also proceed at least partially from a launcher 3, 4 or another unit of the weapons system. Corresponding considerations apply to the method steps described below, in particular to the extent that these permit execution on distributed computing units.

Before launching the effector 2, in the phase shown in FIG. 1, unique identifiers ID1, ID2, ID3 can be assigned to the weapons system units 3, 4. In this phase, the identifiers ID1 to ID3 can be transmitted together with position data P1, P2, P3 of the respective launchers 3, 4 to the effector 2 provided for launching in such a way that the position data P1 to P3 are each uniquely assigned to the respective identifier ID1 to ID 2.

This can, for example, take place in that the position data P1, P2, P3 and respective identifiers ID1, ID2, ID3 are each transmitted together in one data packet as a 2-tuple: {ID1, P1}; {ID2, P2}; {ID3, P3}. The 2-tuples can be transmitted, as in the example illustrated, from the TOC 6, through the launcher 3 to the effector 2. The respective launchers 3, 4 can alternatively also transmit corresponding 2-tuple data packets to the other weapons system units. For the sake of clarity, data packets are in particular identified by curly brackets.

Before the effector 2 is launched it thus knows the IDs assigned to the weapons system units 3, 4, as well as the position data P linked to the IDs.

FIG. 2 shows the weapons system 1 in a first phase PH1 after launching the effector 2. The launch of the effector 2 can be initiated or commanded by the TOC 6 through a corresponding launch signal A (see FIG. 6).

After the effector 2 has been launched it can, supported for example by inertial navigation, performed for example by an effector-side computing unit, ascertain inter alia the position of the effector 2 with reference to a predefined reference system.

The purpose in particular of checking and/or improving the accuracy of the position ascertained by inertial navigation, is that the weapons system can ascertain additional position information in accordance with the method according to the invention, independently of the inertial navigation, which will be considered in more detail below.

After launching {A} the effector 2, respective timestamps Z, uniquely assigned to the position data P1, P2 of the respective launchers 3, 4 are transmitted to the effector by the weapons system units 3, 4 that are located within data transmission range R with the effector, in the present case the launcher 3 and one of the launchers 4.

In the present case the unique assignment is achieved in that the effector 2 already knows the respective IDs and associated position data P, and the timestamps Z are transmitted with respective data packets together with the IDs.

In the present example the launcher 3 for example transmits the data packet $\{ID1, Z1_i\}$, with i=1, 2, 3, ... (wherein the index i identifies repeated or periodic transmissions of data packets), and the launcher 4 that is within transmission range R of the effector in the first phase PH1 transmits the data packet $\{ID2, Z2_i\}$, with i=1, 2, 3, .... The effector 2 receives these data packets at respective receipt time points E1 and E2 at the effector's own time, which is in time synchronization with the weapons system 1.

As a result of the time synchronization that is present in the weapons system 1, and of the unique assignment between timestamps $Z1_i$, $Z2_i$ and position data P1, P2, the effector 2 can ascertain the distances d1 and d2 from the respective launcher 3, 4 from the respective time-of-flight difference of the data transmission, i.e. $\Delta(E1, Z1_i)$ and $\Delta(E1, Z2_i)$ and the known signal speed of the data transmission.

With the support of the distances d1, d2 and of the position data P1 and P2 uniquely assigned to them, the effector 2 can ascertain position information, for example through triangulation, that can be used for checking or correcting the position obtained from inertial navigation. If the situation with respect to data is adequate, the effector 2 can also ascertain the position of the effector 2 itself from the position information.

The transmission of the timestamps Z1; and Z2; can take place time-synchronously. The transmission of the timestamps Z can further take place periodically, at least as long as the respective launcher 3, 4 is within transmission range R, so that the effector can substantially ascertain position information continuously, independently of the inertial navigation (such a periodic or continuous transmission is indicated herein for the exemplary embodiment by the index i).

In FIG. 3 the weapons system 1 is shown in a second phase PH2 after launch of the effector 2, in which the effector 2 has moved forwards along the flight path 7. In this second phase PH2, the launcher 3 is located outside the transmission range R. Instead, the further second launcher 4 that until now was located outside the transmission range R however now lies within the transmission range R.

Figure 6:
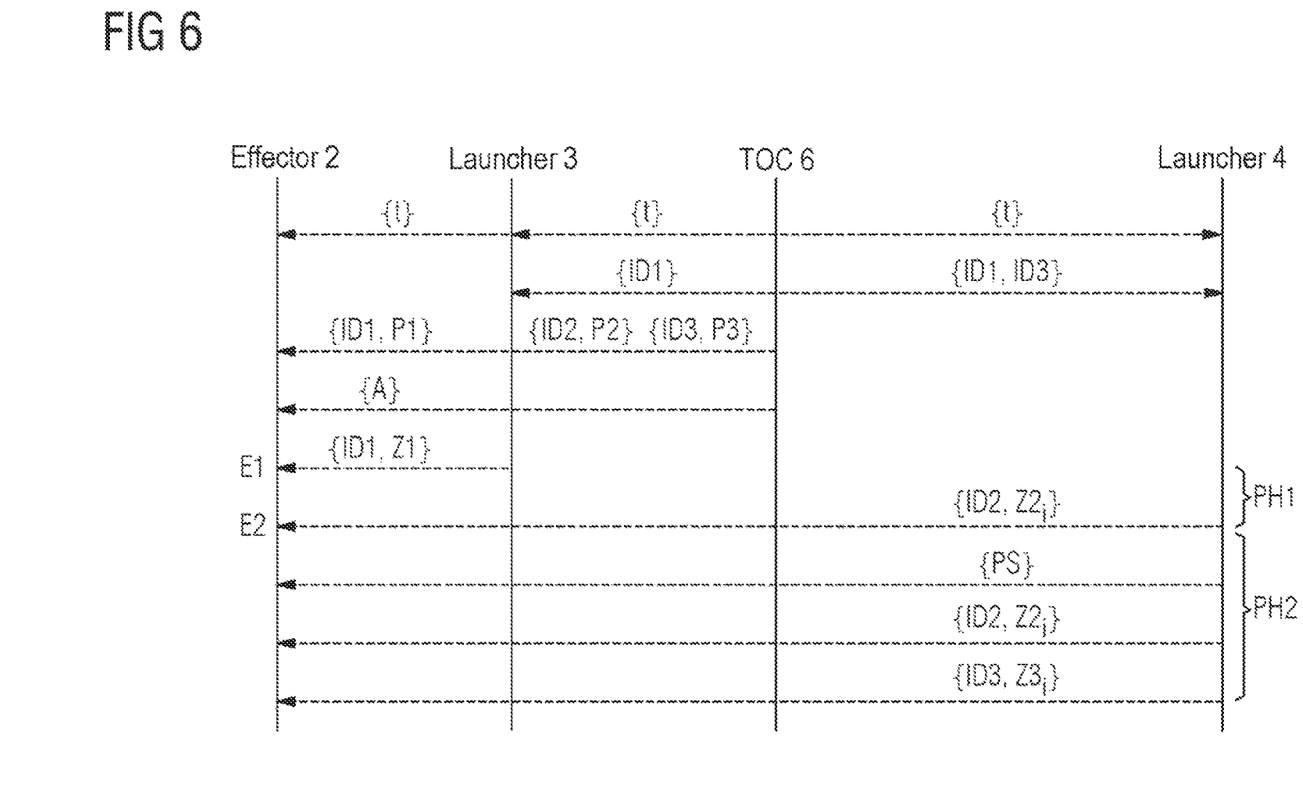
FIG. 6 is an exemplary transmission diagram in a method for ascertaining position information.

If the effector 2 reaches a position along the flight path 7 in which a transmission with the launcher 4 that was previously not located within transmission range R is/becomes possible, a data communication connection can be created or negotiated between the effector 2 and this launcher 4 on the basis of a successful ping signal PS (the call-waiting signal) transmitted from the launcher 4 (see also FIG. 6).

In response to a successful ping signal PS, the second launcher 4 starts to periodically transmit timestamps $Z3_i$ with a unique assignment to the position data P3 of the launcher 4 through the wireless communication connection established with the effector 2. The unique assignment in this case, as in the first phase PH 1, is established in that the timestamps $Z3_i$ are transmitted to the effector 2 together with the associated identifier ID3 in a data packet formed as a 2-tuple: $\{ID3; Z3_i\}$ (see FIG. 6). In the second phase PH2 the effector 2 thus receives periodically timestamps $Z2_i$, $Z3_i$, and can, as in the first phase PH 1, ascertain analogous position information, e.g. distances d2' and d3, based in particular on corresponding receipt time points E2' and E3, and use these in a corresponding way for triangulation.

Figure 4:
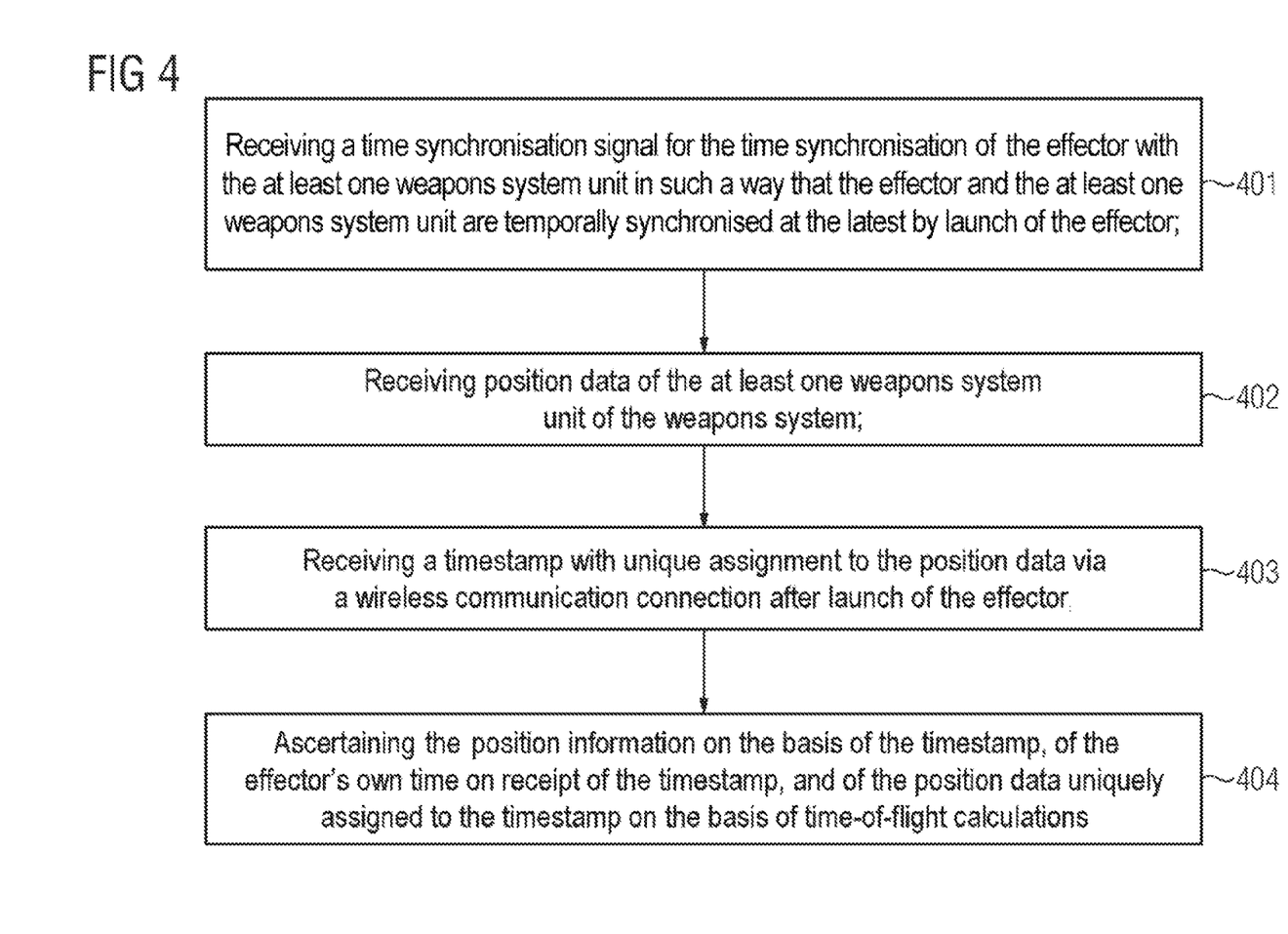
FIG. 4 is an example of an effector-side flow diagram of a method for ascertaining position information.

FIG. 4 shows, by way of example, an effector-side flow diagram of a method for ascertaining position information for the effector 2. In a first step 401, the effector 2 receives a time synchronization signal $\{t\}$ for the time synchronization of the weapons system 1, i.e. for the time synchronization of the effector 2 with the weapons system units 3, 4, 6. The time synchronization in this case takes place in such a way that the effector 2 and the at least one weapons system unit 3, 4, 6 are temporally synchronized at the latest by the launch of the effector 2.

In a second step 402, the effector receives position data of the at least one weapons system unit 3, 4, 6 of the weapons system 1. The step of transmitting the position data can take place before or after the time synchronization. It is, however, advantageous if the position data are transmitted to the effector 2 before launching, since in this way the quantity of data to be transmitted after launch can be reduced.

In a further step 403 the effector 2 receives a timestamp (e.g. $\{IDj; Zji\}$), wherein the index j identifies the weapons system unit, and the index i identifies the sequence of the timestamps transmitted by the respective weapons system unit j. The timestamps are transmitted with a unique assignment to the position data through a wireless communication connection after the effector 2 has been launched. In one exemplary embodiment, the unique assignment can take place on the basis of an identifier uniquely assigned to the respective weapons system unit.

In a further step 404 the position information is ascertained by the effector 2 on the basis of the timestamp, the effector's own time at receipt of the timestamp, and the position data uniquely assigned to the timestamp on the basis of time-of-flight calculations. The position information ascertained in this way can, for example, be used for correction and/or checking of the position of the effector 2 ascertained by an independent method, e.g. inertial navigation.

Figure 5:
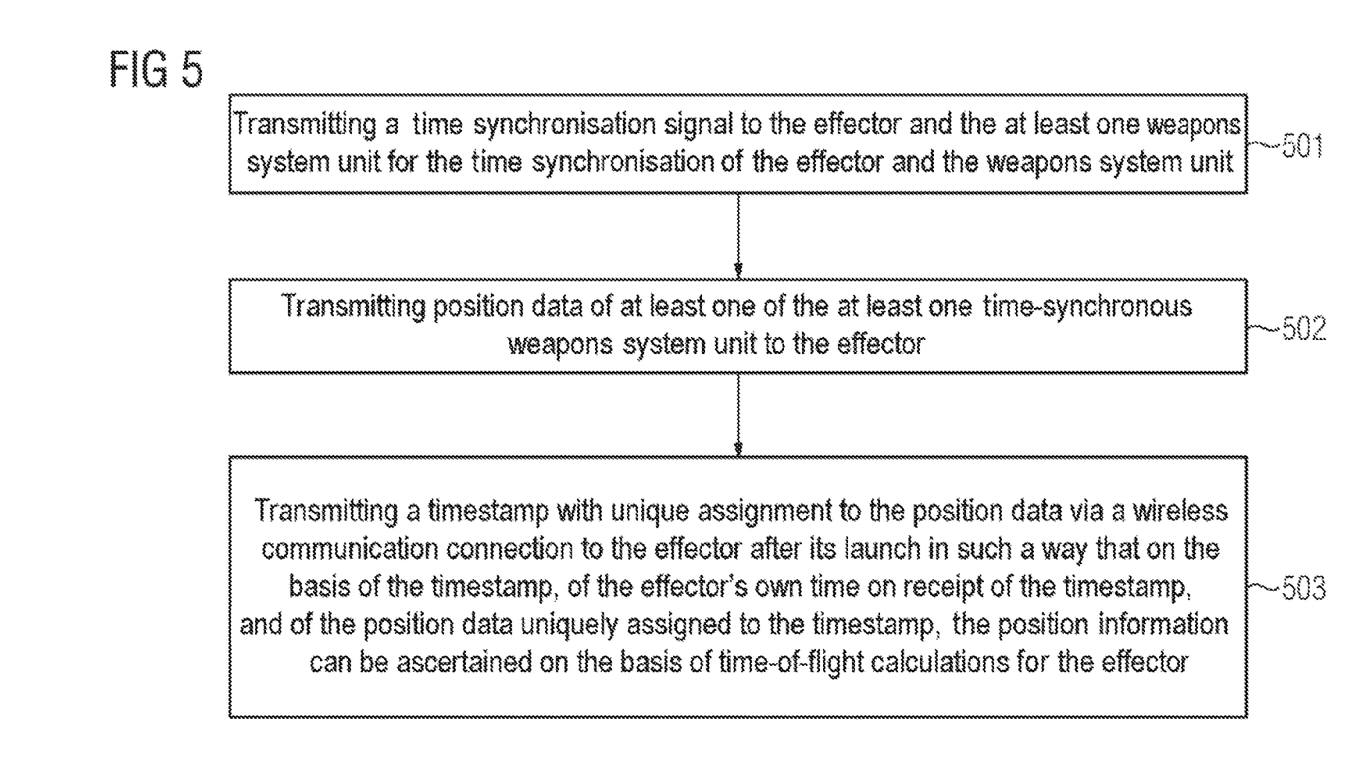
FIG. 5 is an example of a control computer-side flow diagram of a method for ascertaining position information.

FIG. 5 shows by way of example a flow diagram of a method that can for example be carried out on the control computer-side for ascertaining position information for the effector 2. In a first step 501, a weapons system unit 3, 4, 6 transmits a time synchronization signal to the effector 2 and the further weapons system units 3, 4, 6 for the time synchronization of the weapons system 1, in particular for the time synchronization of the effector 2 and the weapons system unit(s) 3, 4, 6.

In a further step 502, the respective weapons system unit 3, 4, 6 transmits position data of at least one, preferably all, of the weapons system units 3, 4, 6 that are available and are relevant for the flight path 7 of the effector 2, to the effector 2. As already explained, the position data can be transmitted before or after the time synchronization.

In a further step 503, the respective weapons system unit 3, 4, 6 transmits a timestamp with unique assignment to the position data through a wireless communication connection to the effector after it has been launched.

The transmission of the timestamp takes place in such a way that the effector 2 can ascertain the position information on the basis of the timestamp, the effector's own time at receipt of the timestamp, and the position data uniquely assigned to the timestamp on the basis of time-of-flight calculations.

The time synchronization previously performed in particular underlies step 503, on the basis of which and of time-of-flight calculations, distances between the effector 2 and the positions of the weapons system units 3, 4, 6 when the timestamp is received can be calculated. The distances ascertained in this way can be used as position information for controlling and/or correcting positions already known to the effector 2 from other position ascertainment methods.

FIG. 6 shows an exemplary transmission diagram of a method for ascertaining position information. The data transmitted or received according to the transmission diagram illustrated correspond to the exemplary embodiments described with reference to FIGS. 1 to 5. To that extent, reference is made to the full extent to the above explanations. It is further noted that the invention described herein includes a transmission or a reception of data on the basis of all of the given units 2, 3, 4, 6 of the weapons system 1. The underlying invention accordingly also includes all data transmissions between the respective units, in particular in connection with a navigation of an effector 2, for example of a guided missile, to a target location or target object.

The following is a summary list of reference numerals and the corresponding structure used in the above description of the invention:
1 Weapons system
2 Effector
3 First launcher
4 Second launchers
5 Data communication connection
6 Tactical control center
7 Flight path
t Time synchronization signal
ID Identifier
P Position data
A Launch signal
R Data transmission range
Z Timestamp
d Distance
PH Phase
PS Ping signal

The invention claimed is:

1. A method for ascertaining position information for an effector after launching from a launcher of a weapons system having the effector and at least one mobile or stationary weapons system unit different from the effector, the method comprising:
   receiving a time synchronization signal for a time synchronization of the effector with the at least one weapons system unit for temporally synchronizing the effector and the at least one weapons system unit no later than launching of the effector;
   receiving position data of the at least one weapons system unit of the weapons system;
   receiving a timestamp with a unique assignment to the position data through a wireless communication connection after the effector has been launched;
   receiving the position data and the timestamp as a 2-tuple in a data packet or receiving the position data, the timestamp, and an identifier as a 3-tuple in a data packet; and
   ascertaining the position information based on the timestamp, the effector's own time upon receipt of the timestamp, and the position data assigned uniquely to the timestamp.

2. The method according to claim 1, which further comprises carrying out the method at the effector.

3. The method according to claim 1, which further comprises receiving the position data and timestamps with unique assignment to the position data from two or more weapons system units located at different positions, and calculating the position information based on triangulation.

4. The method according to claim 3, wherein the timestamps of the two or more weapons system units are identical in terms of the time synchronization.

5. The method according to claim 1, which further comprises providing the unique assignment between the position data and the respective timestamp by linking the position data and the timestamp when they are transmitted.

6. The method according to claim 1, which further comprises providing the unique assignment between the position data and the respective timestamp by using a unique identifier received together with at least one of the position data or the respective timestamp.

7. The method according to claim 1, which further comprises configuring the effector to receive at least one of the position data or the timestamp with the unique assignment after the launch of the effector from selected weapons system units of the weapons system entering into transmission range of the effector at least in sections along a flight path of the effector, selecting the weapons system units based on a simulation of the flight path of the effector, and selecting the weapons system units for which a probability of wireless communication with the effector lies above a predefined threshold value at least in sections along the flight path.

8. An effector or a missile configured for launching from a launcher of a weapons system, the effector comprising:
   an electronic data processing unit with a memory including instructions which, when executed by the data processing unit, carry out the method according to claim 1.

9. A computing unit or command computing unit for monitoring and controlling a launcher of at least one of a weapons system or of an effector for launching the effector, the computing unit or command computing unit comprising: an electronic data processing unit and an electronic data memory including instructions which, when executed by the data processing unit, carries out the method of claim 1.

10. The method according to claim 1, which further comprises using the position data to state or describe the position of a weapons system unit assigned to the position data in a coordinate reference system used by the weapons system or in a coordinate reference system defined for a respective weapons system unit.

11. The method according to claim 1, which further comprises providing the time stamp with a temporal signature of a transmitting time point at which a data packet is transmitted to the effector or with a counter value of a counter of the weapons system unit.

12. A method for ascertaining position information for an effector after launching from a launcher of a weapons system having the effector and at least one mobile or stationary weapons system unit different from the effector, the method comprising:
   transmitting a time synchronization signal to the effector and the at least one weapons system unit for time synchronization of the effector and the weapons system unit;
   transmitting position data of the at least one time-synchronous weapons system unit to the effector; and
   transmitting a timestamp with unique assignment to the position data through a wireless communication connection to the effector after launching the effector, permitting the position information based on the timestamp, the effector's own time at the receipt of the timestamp, and the position data uniquely assigned to the timestamp, to be ascertained for the effector; and
   transmitting the position data and the timestamp as a 2-tuple in a data packet or transmitting the position data, the timestamp, and an identifier as a 3-tuple in a data packet.

13. The method according to claim 12, which further comprises transmitting at least the position data and the timestamp, at least partially to the effector from the respective weapons system unit itself or from a control unit with a data connection to the weapons system unit.

14. The method according to claim 12, which further comprises locating two or more of the weapons system units at different positions, and transmitting timestamps corresponding to available position data, each with unique assignment to the respective position data, to the effector for ascertaining the position information.

15. The method according to claim 14, which further comprises carrying out the transmission of the timestamps time-synchronously.

16. The method according to claim 12, which further comprises using at least one of the at least one weapons system units to repeatedly transmit timestamps with unique assignment to the position data through the wireless communication connection to the effector after the effector has been launched.

17. The method according to claim 12, which further comprises at least one of:
   when a change occurs in the position data of one of the at least one weapons system unit after launch of the effector, transmitting the changed position data and a timestamp uniquely assigned to the changed position data, or when no change occurs in the position data, transmitting only a timestamp with unique assignment to the unchanged position data to the effector in succeeding transmissions.

18. The method according to claim 12, which further comprises transmitting a call-waiting signal to the effector, and carrying out at least one temporally first transmission of at least one of the position data or the timestamp to the effector only when the call-waiting signal is successful at the effector.

19. The method according to claim 12, which further comprises providing the unique assignment between the position data and the timestamp by at least one of transmitting the position data and the assigned timestamp to the effector together or transmitting at least one of the position data or the respective timestamp to the effector together with a respectively unique identifier.

20. The method according to claim 19, wherein the identifier is uniquely assigned to the weapons system unit.

21. The method according to claim 12, which further comprises selecting only the weapons system units for a transmission of at least one of the position data or the timestamp to the effector that enter into a transmission range with the effector at least in sections along a flight path of the effector.

22. The method according to claim 21, which further comprises carrying out a selection of weapons system units based on a simulation of the flight path of the effector.

23. The method according to claim 21, which further comprises selecting weapons system units for which a probability of wireless communication with the effector lies above a predefined threshold value at least in sections along the flight path.

24. A computing unit or command computing unit for monitoring and controlling a launcher of at least one of a weapons system or of an effector for launching the effector, the computing unit or command computing unit comprising:
    an electronic data processing unit and an electronic data memory including instructions which, when executed by the data processing unit, carries out the method of claim 12.

* * * * *